Patented Dec. 28, 1948

2,457,109

UNITED STATES PATENT OFFICE 2,457,109

PROCESS OF PREPARING 2-AMINO-4-HYDROXY-6-METHYL PYRIMIDO [4,5-b] PYRAZINE

James H. Boothe, Pearl River, N. Y., assignor, by mesne assignments, to American Cyanamid Company, New York, N. Y., a corporation of Maine No Drawing. Application February 2, 1946,
Serial No. 645,253

3 Claims. (Cl. 260—251)

This invention relates to a new method of preparing 2-amino-4-hydroxy-6-methylpyrimido [4,5-b] pyrazine.

The product and the process of the present invention may be illustrated by the following equation:

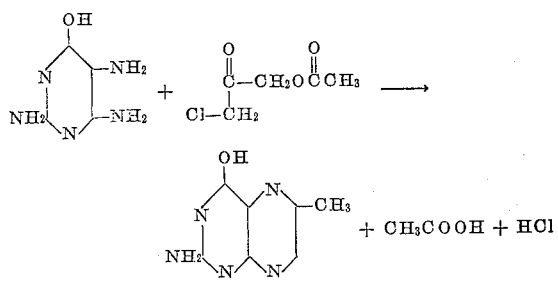

As illustrated, 2,4,5-triamino-6-hydroxypyrimidine is reacted with chloroacetol acetate to yield 2-amino-4-hydroxy-6-methyl [4,5-b] pyrazine.

As will be understood by chemists skilled in the art, the 2,4,5-triamino-6-hydroxypyrimidine also exists in one or more tautomeric forms, such as, for example, 2,4,5-triamino-pyrimidone-6. This and other tautomers may be used in the reaction without modification of any of the essential conditions thereof.

Although the equation shows the use of chloroacetol acetate, it will be understood that other related esters of haloacetols may be used; for example, bromoacetol acetate, chloroacetol propionate, and the like.

Because of the relative instability of the haloacetol ester, the reaction may be caused to take place by merely mixing the reactants in an appropriate solvent such as water, ethyl alcohol, propylene glycol, dioxane, or other inert solvent or mixtures thereof. A slight degree of heating may be used to speed up the reaction.

In illustration of the invention, 0.5 gram of chloroacetol acetate (Ber. 48 2004) and 0.5 gram of 2,4,5-triamino-6-hydroxypyrimidine were dissolved in 50 ml. of water and heated on a steam bath for 50 minutes at 50° C. A yellow precipitate formed. The mixture was cooled and the precipitate was filtered off and dried. It was later recrystallized from 5 N sodium hydroxide and then twice from water. The product was found to be identical with a known sample of 2-amino-4-hydroxy-6-methylpyrimido [4,5-b] pyrazine, which had been previously prepared by another method.

I claim:

1. A method of preparing 2-amino-4-hydroxy-6-methylpyrimido [4,5-b] pyrazine which comprises mixing together in a solvent 2,4,5-triamino-6-hydroxy pyrimidine and an ester of a haloacetol and thereafter recovering the said product.

2. A method of preparing 2-amino-4-hydroxy-6-methylpyrimido [4,5-b] pyrazine which comprises mixing together and heating 2,4,5-triamino-6-hydroxy pyrimidine and chloroacetol acetate and thereafter recovering the said product.

3. A method of preparing 2-amino-4-hydroxy-6-methylpyrimido [4,5-b] pyrazine which comprises mixing together 2,4,5-triamino-6-hydroxy pyrimidine and chloroacetol acetate in water and heating the solution and thereafter recovering the said product.

JAMES H. BOOTHE.

No references cited.